United States Patent [19]

Cornell

[11] Patent Number: 5,529,275
[45] Date of Patent: Jun. 25, 1996

[54] VEHICLE SEAT TRACK ASSEMBLY

[75] Inventor: Troy M. Cornell, Farmington Hills, Mich.

[73] Assignee: Lear Seating Corporation, Southfield, Mich.

[21] Appl. No.: 302,402

[22] Filed: Sep. 8, 1994

[51] Int. Cl.$^6$ ................................................. F16M 13/00
[52] U.S. Cl. ........................................ 248/429; 296/65.1
[58] Field of Search ................................. 248/429, 424, 248/419, 420, 430; 296/65.1

[56] References Cited

U.S. PATENT DOCUMENTS

| | | | |
|---|---|---|---|
| 1,716,316 | 6/1929 | Lanning | 297/344.1 X |
| 3,933,331 | 1/1976 | Blom | 248/425 |
| 4,440,442 | 4/1984 | Drouillard et al. | 297/341 |
| 4,671,571 | 6/1987 | Gionet | 297/341 |
| 4,781,414 | 11/1988 | Periou | 297/313 |
| 5,137,331 | 8/1992 | Colozza | 297/341 |
| 5,336,355 | 11/1994 | Hayden et al. | 248/429 X |

*Primary Examiner*—Ramon O. Ramirez
*Attorney, Agent, or Firm*—Howard & Howard

[57] ABSTRACT

A vehicle seat and seat track assembly (10) provides both incremental fore and aft seat adjustment and full fore and aft seat placement to allow easy access to a location behind a vehicle seat. The assembly (10) comprises a vehicle seat (12) having a front side, a back side, an inboard side and an outboard side. A seat track mechanism (22) attaches to the seat (12) to provide incremental fore and aft seat adjustment along the length of the seat track (22). A floor track mechanism (24) slideably supports the seat track mechanism (22) for full fore and aft placement of the seat track mechanism (22) and the seat (12). The floor and seat track mechanisms (24,22) attach in non-parallel relationship to one another for moving the seat (12) laterally as the seat (12) moves forward along the floor track mechanism (24) to allow the seat to clear an obstacle (100) located in front and inboard of the seat.

13 Claims, 3 Drawing Sheets

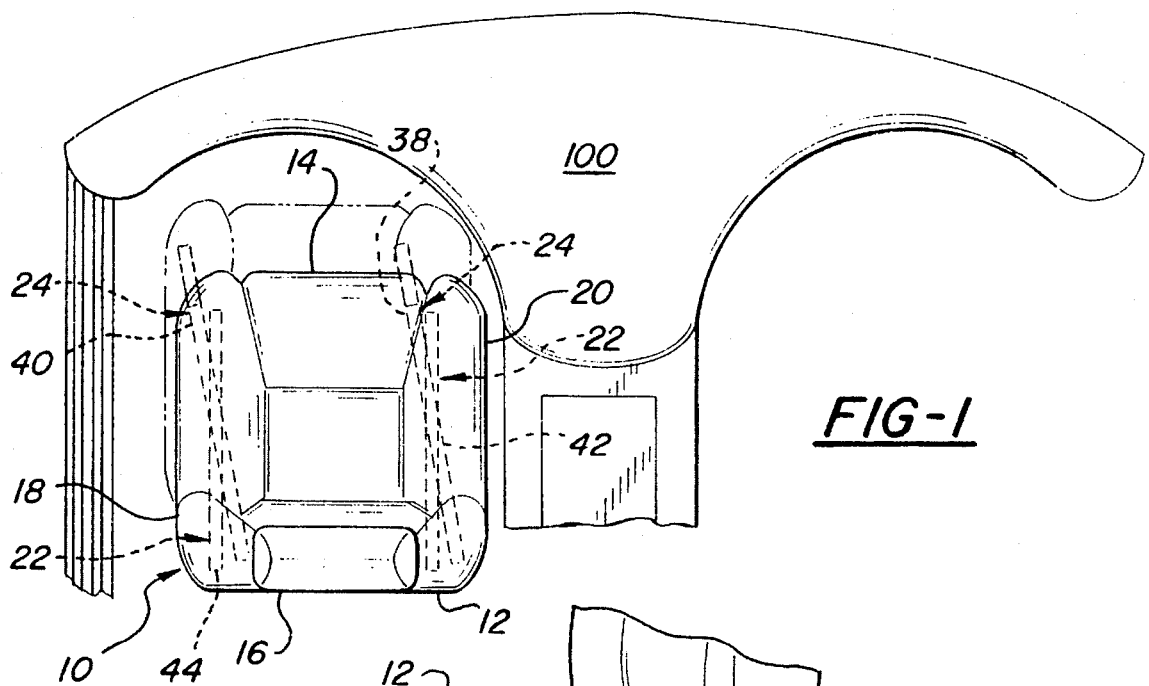
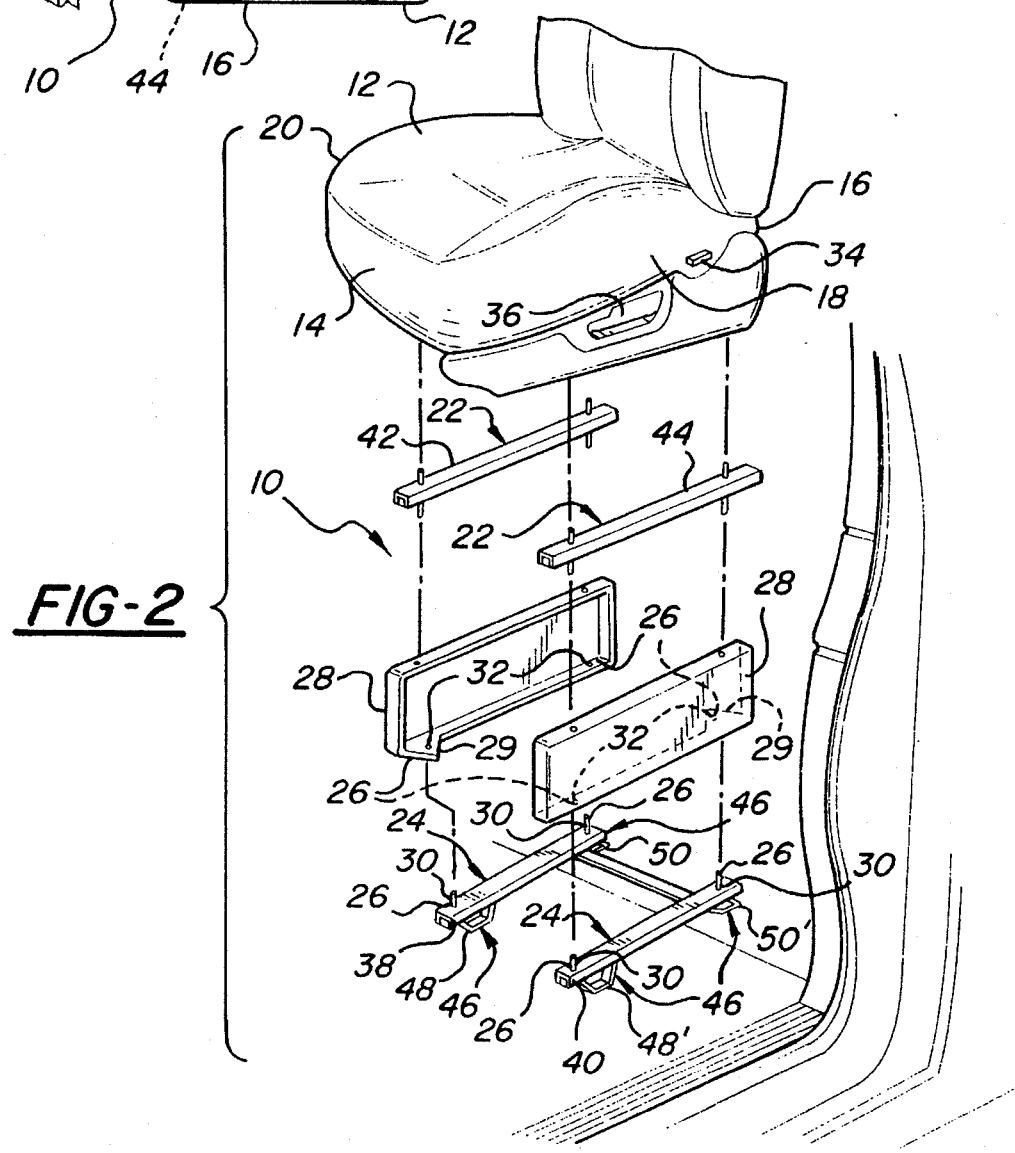

VEHICLE SEAT TRACK ASSEMBLY

TECHNICAL FIELD

The subject invention relates to vehicle seat adjustment assemblies, and more particularly to vehicle seat adjustment assemblies of the type having both incremental fore and aft seat adjustment, and full fore and aft seat placement to provide easy access to a location behind the seat.

BACKGROUND OF THE INVENTION

In the vehicle seat art it is commonly known to make vehicle seats having both incremental fore and aft seat adjustment and full fore and aft seat placement to allow for easy access to a location behind the vehicle seat. This is illustrated in U.S. Pat. No. 5,137,331 to Colozza. The incremental adjustment feature enables a user to move the seat incrementally fore and aft to locate a comfortable setting, and to lock the seat at the particular setting. The full fore and aft seat placement feature allows a person to "dump" or "tip-slide" the seat from a fully rearward and locked position to a fully forward position to enable easy access to a back seat or to a rear storage area. When the seat is moved back to its fully rearward and locked position, which is the position the seat should be in during operation of the vehicle if a person is sitting in the seat, the particular comfort setting has not been disturbed. In this way, the seat with separate adjustment and "dumping" systems is said to have "memory." A seat having this "dumping" or "tip-slide" feature works well when there is an unobstructed path in the vehicle for the seat to travel. But if the path is obstructed, the seat cannot travel as far forward as is sometimes necessary. In particular vehicles there may be an obstacle such as a center console which would prohibit the seat from moving forward a distance sufficient to allow access to a location behind the seat.

SUMMARY OF THE INVENTION AND ADVANTAGES

A vehicle seat and seat track assembly of the type for providing both incremental fore and aft seat adjustment and full fore and aft seat placement to allow easy access to a location behind the vehicle seat comprises a vehicle seat having a front side, a back side, an inboard side and an outboard side. The assembly also comprises seat track means attached to the seat for slideably supporting the seat for fore and aft movement along the seat track means. The assembly further comprises floor track means for slideably supporting the seat track means for fore and aft movement along the floor track means. The assembly is characterized by angled attachment means for attaching the floor and seat track means in non-parallel relationship to one another for moving the seat laterally.

If the floor and seat track means are attached at an angle, the seat can move laterally as it moves forward. This will allow the seat to avoid many obstructions such as described above. Therefore, the seat can move forward far enough to allow access to a location behind the seat.

FIGURES IN THE DRAWINGS

Other advantages of the present invention will be readily appreciated as the same becomes better understood by reference to the following detailed description when considered in connection with the accompanying drawings wherein:

FIG. 1 is a top view of the interior of a vehicle showing a vehicle seat and the subject seat track assembly in phantom;

FIG. 2 is an exploded view showing the vehicle seat and the seat track assembly;

DESCRIPTION OF THE PREFERRED EMBODIMENT

Figure 3:
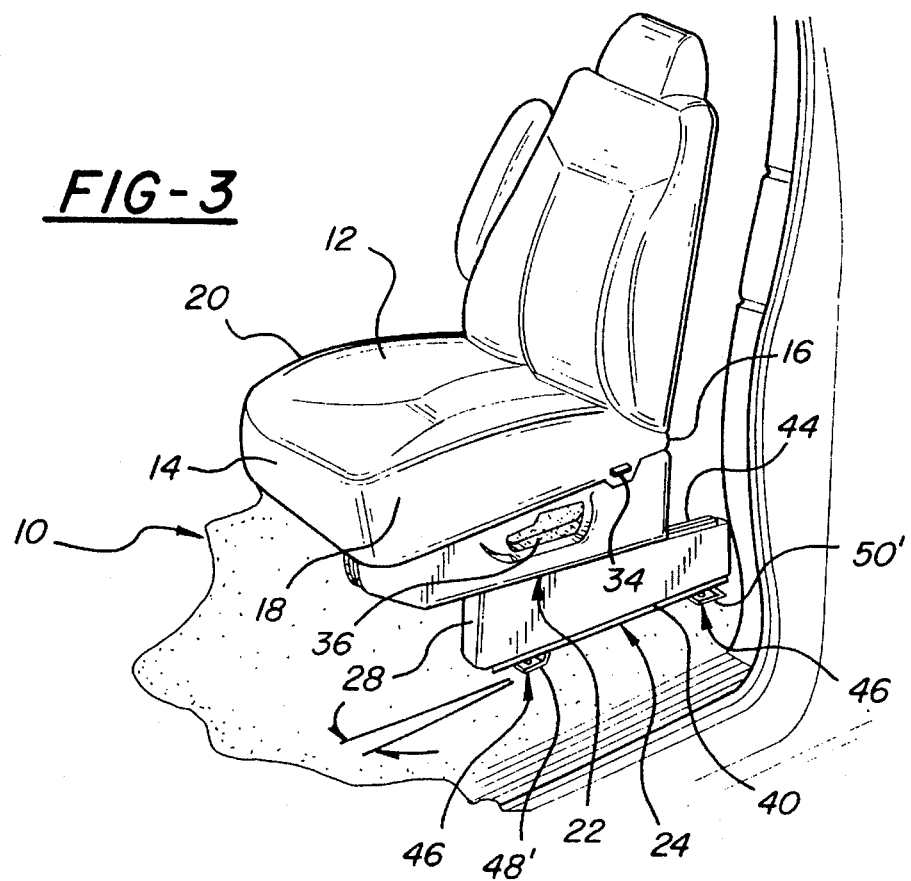
FIG. 3 is a side perspective view of the vehicle seat and seat track assembly with the seat in the fully rearward and locked position along the floor tracks.

Referring to the Figures wherein like numerals indicate like or corresponding parts throughout the several views, a vehicle seat and seat track assembly is generally shown at 10.

The assembly 10 is of the type for providing both incremental fore and aft seat adjustment and full fore and aft seat placement to allow easy access to a location behind the vehicle seat. The assembly 10 comprises a vehicle seat 12 having a front side 14, a back side 16, an outboard side 18 and an inboard side 20. The assembly 10 also comprises seat track means generally indicated at 22 attached to the seat 12 for slideably supporting the seat in increment fore and aft movement along the seat track means 22. The assembly 10 further comprises floor track means generally indicated at 24 for slideably supporting the seat track means 22 for full fore and aft movement along the floor track means 24. The assembly 10 is characterized by angled attachment means 26 for attaching the floor and seat track means 24,22 in non-parallel relationship to one another for moving the seat 12 laterally.

As shown in FIG. 1, the seat track means 22 is attached to the seat 12 to extend in parallel alignment with the outboard and inboard sides 18,20 of the seat 12. The floor track means 24 is attached to the seat track means 22 to angle toward the outboard side 18 of the seat 12 as the floor track means 24 extends toward the front side 14 of the seat 12. More specially, the floor tracks means 24 is fixedly mounted to the vehicle floor at a predetermined angle extending toward the outboard side 18 of the seat 12 and in nonparallel relation to the seat track means 22. In other words, the front of the floor track means 24 is closer to the outboard side 18 of the seat 12 than the back of the floor track means 24. The attachment means attaches the floor track means 24 with respect to the seat track means 22 at an angle of five degrees. This is sufficient to displace the seat 12 laterally when it moves forward in order to avoid particular obstacles. In the present case the obstacle is a particular center console 100 in a vehicle. Those skilled in the art can appreciate that the degree of angling of the floor track means 24 will vary from situation to situation in order to accomodate various obstacles.

Figure 4:
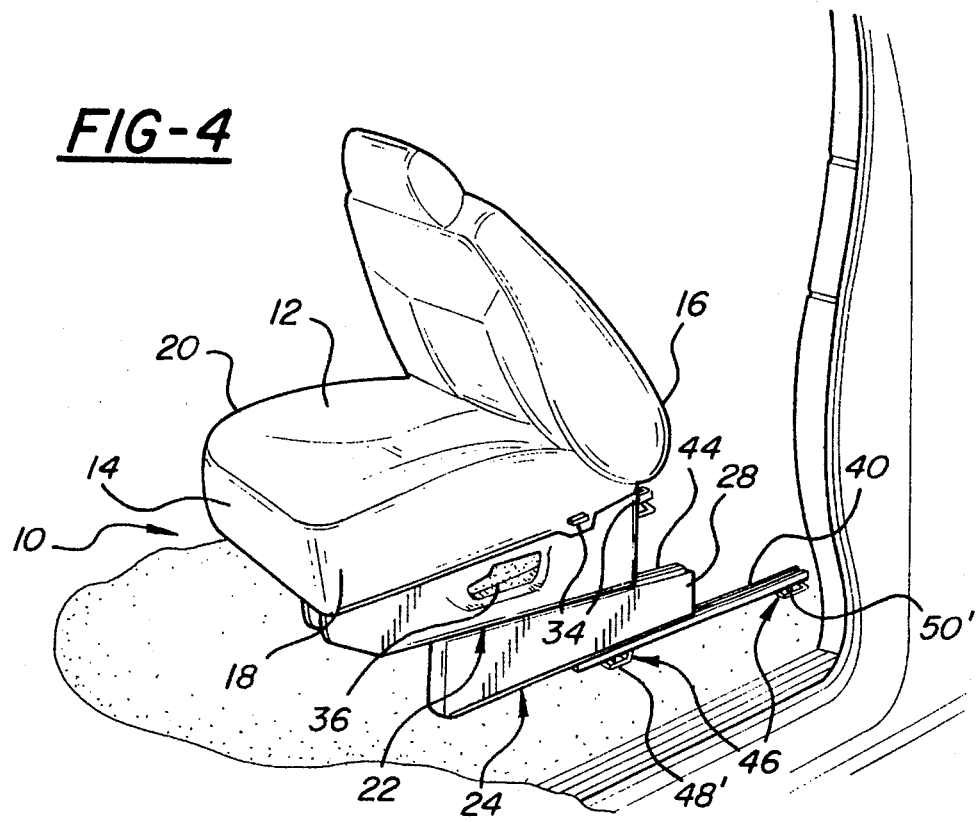
FIG. 4 is a view similar to that shown in FIG. 3 with the seat in the fully forward position along the floor tracks.
Figure 5:
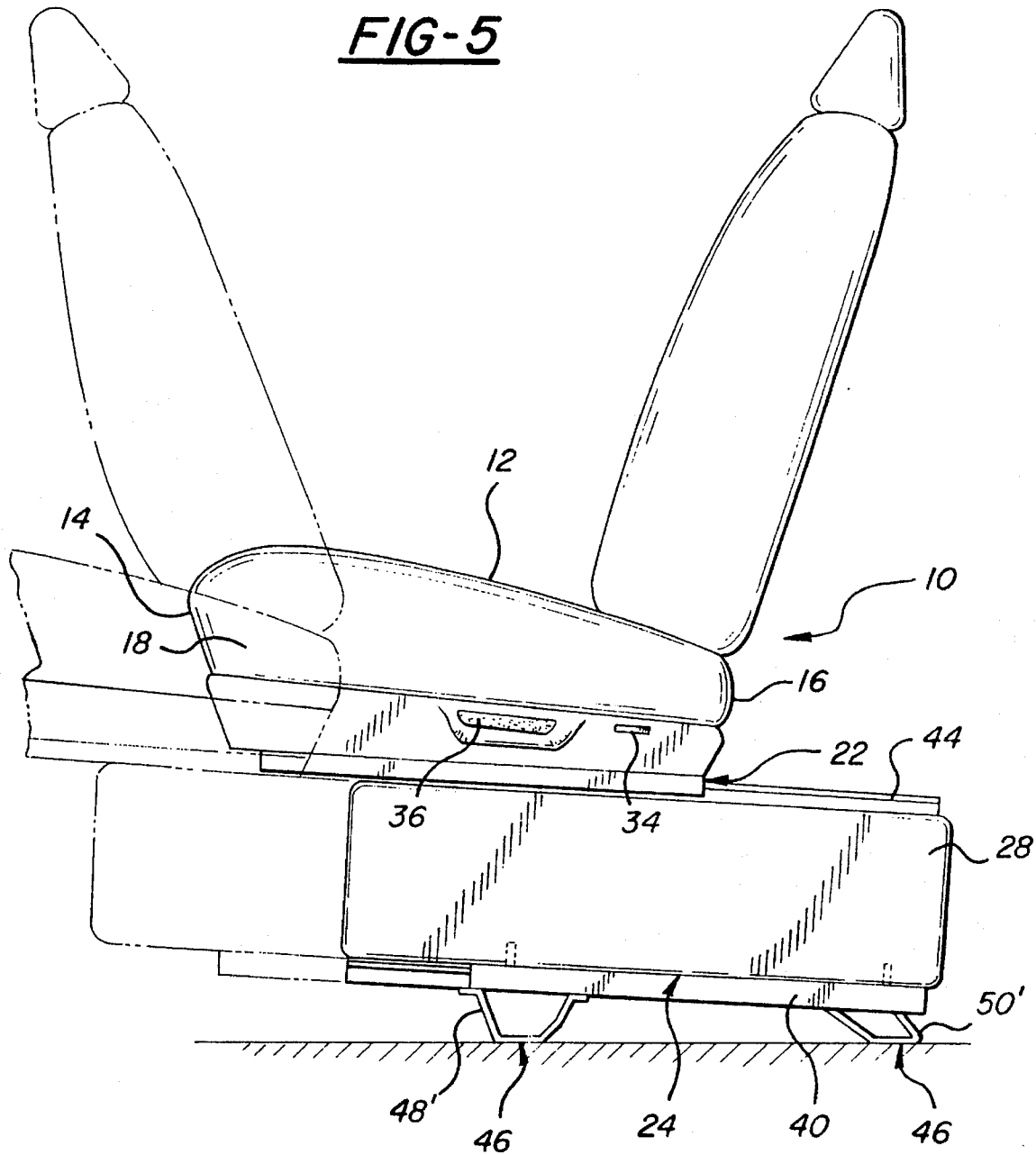
FIG. 5 is a side view of the subject seat and seat track assembly.

The assembly 10 may further include a riser 28 disposed between the floor track means 24 and the seat track means to space the seat 12 above the floor track means 24. The type of riser 28 used will vary with the type of vehicle used and with the type of seat adjustment mechanism—e.g. manual or power. As shown in FIG. 4, each of the seat aft seat adjustment 22 by the seat track means 22 and full fore and aft seat positioning by the floor track means 24.

The angled attachment means 26 includes bolts 30 for attaching the floor track means 24 to the riser 28 and tabs 29 which extend inwardly in the manner shown in FIG. 2. The angled attachment means also includes attachment holes 32 defined by the riser 28 and the tabs 29 of the riser 28 for receiving the bolts 30, the holes 32 being formed in the riser 28 to attach the floor track means 24 at the prescribed angle of five degrees with respect to the seat 12 when the bolts 30 extend through the holes 32. The angled attachment means 26 may alternatively involve welding the riser 28 to the floor track means 24 at the prescribed angle. As shown in FIG. 1 and 2, the floor track means 24 angles outwardly toward the outboard side 18 of the seat 12 and the angle attachment means 26 including the inwardly extending tabs 29, bolts 30 and holes 32 align the riser 28, and thus, the seat track means 22, parallel with the sides 18, 20 of the seat 12.

The floor track means 24 includes easy exit means 34 for moving the seat 12 from a fully rearward position along the floor track means 24 in which the seat 12 is locked during operation of the vehicle, to a fully forward position along the floor track means 24 to allow a person seated behind the seat 12 to pass between the outboard side 18 of the seat 12 and the vehicle. Easy exit means 34, known in the art as "dumping" or "tip-slide" mechanisms are old and well known. One example is shown in U.S. Pat. No. 5,137,331 to Colazza. The particular type of easy exit means 34 used is not crucial to the operation of the invention.

The seat track means 22 includes seat adjustment means 36 for fixedly positioning the seat 12 in one of a plurality of locations along the seat track means 22. The seat adjustment means 36 can be a manual or power (e.g. electric) seat adjuster. This is also shown in the U.S. Pat. No. 5,137,331.

The floor track means 24 and the seat track means 22 are in spaced apart and parallel planes. The floor track means 24 includes a floor inboard track assembly 38 and a floor outboard track assembly 40 spaced apart and parallel to the floor inboard track assembly 38. Similarly, the seat track means 22 includes a seat inboard track assembly 42 and a seat outboard track assembly 44 spaced apart and parallel to the seat inboard track assembly. The particular type of track assembly used is not material to the invention. One example of a track assembly is shown in U.S. Pat. No. 5,137,331. Another example of a track assembly is widely sold by Atoma International of Livonia, Mich.

The floor inboard and the floor outboard track assemblies 38,40,42,44 each have a front end disposed adjacent the front side 14 of the vehicle seat 12 and an oppositely disposed rear end. Seat platform means generally indicated at 46 supports the front ends of the floor inboard and floor outboard track assemblies above the rear ends when the seat 12 is disposed in the vehicle. This feature enables the seat 12 to clear an obstacle such as a floor mat which may be disposed in front of the seat 12. The seat platform means 46 includes a front pedestal 48 and a rear pedestal 50 disposed on the floor inboard track assembly 38, and a front pedestal 48' and a rear pedestal 50' disposed on the floor outboard track assembly 40, the front pedestals 48,48' being taller than the rear pedestals 50,50'.

The invention has been described in an illustrative manner, and it is to be understood that the terminology which has been used is intended to be in the nature of words of description rather than of limitation.

Obviously, many modifications and variations of the present invention are possible in light of the above teachings. Therefore, it is to be understood that within the scope of the appended claims the invention may be practiced otherwise than as specifically described. Moreover, the reference numerals are merely for convenience and are not intended to be in any way limiting.

We claim:

1. A vehicle seat and seat track assembly (10) of the type for providing both incremental fore and aft seat adjustment and full fore and aft seat placement to allow easy access to a location behind the vehicle seat, said assembly (10) comprising;

a vehicle seat (12) having a front side (14), a back side (16), an outboard side (18) and an inboard side (20);

seat track means (22) attached to said seat (12) for slideably supporting said seat (12) for fore and aft movement along said seat track means (22);

floor track means (24) for slideably supporting said seat track means (22) for fore and aft movement along said floor track means (24);

characterized by angled attachment means (26) for attaching said floor and seat track means (24,22) in non-parallel relationship to one another for moving said seat (12) laterally.

2. An assembly (10) as set forth in claim 1 further characterized by said seat track means (22) being attached to said seat (12) to extend in parallel with said inboard and outboard sides (18,20) of said seat (12), said floor track means (24) being attached to said seat track means (22) to angle toward said outboard side (18) of said seat (12) as said floor track means (24) extends toward said front side (14) of said seat (12).

3. An assembly (10) as set forth in claim 2 further characterized by including a riser (28) disposed between said floor track means (24) and said seat track means (22) to space said seat (12) above said floor track means (24).

4. An assembly (10) as set forth in claim 3 further characterized by said angled attachment means (26) including bolts (30) for attaching said floor track means (24) to said riser (28).

5. An assembly (10) as set forth in claim 4 further characterized by said riser (28) defining attachment holes (32) for receiving said bolts (30), said holes (32) being formed in said riser (28) to attach said floor track means (24) at a predetermined angle with respect to said seat (12) when said bolts (30) extend through said holes (32).

6. An assembly (10) as set forth in claim 5 further characterized by said attachment means (26) attaching said floor track means (24) with respect to said seat track means (22) at an angle of five degrees.

7. An assembly (10) as set forth in claim 6 further characterized by said floor track means (24) including easy exit means (34) for moving said seat (12) from a fully rearward position along said floor track means (24) in which said seat (12) is locked during operation of the vehicle, to a fully forward position along said floor track means (24) to allow a person seated behind said seat (12) to pass between said outboard side of said seat (12) and the vehicle.

8. An assembly (10) as set forth in claim 7 further characterized by said seat track means (22) including seat adjustment means (36) for fixedly positioning said seat (12) in one of a plurality of incremental locations along said seat track means (22).

9. An assembly (10) as set forth in claim 8 further characterized by said floor track means (24) and said seat track means (22) being in spaced apart and parallel planes.

10. An assembly (10) as set forth in claim 2 further characterized by said floor track means (24) including a floor inboard track assembly (38) and a floor outboard track assembly (40) spaced apart and parallel to said floor inboard track assembly (38).

11. An assembly (10) as set forth in claim 10 further characterized by said seat track means (22) including a seat inboard track assembly (42) and a seat outboard track assembly (44) spaced apart and parallel to said seat inboard track assembly (42).

12. An assembly (10) as set forth in claim 11 further characterized by said floor inboard and said floor outboard track assemblies (38,40) each having a front end disposed adjacent said front side (14) of said vehicle seat (12) and an oppositely disposed rear end, said assembly including seat platform means (46) for supporting said front ends of said floor inboard and floor outboard track assemblies (38,40) above said rear ends when said seat (12) is disposed in the vehicle.

13. An assembly (10) as set forth in claim 12 further characterized by said seat platform means (46) including a front pedestal (48) and a rear pedestal (50 disposed on said floor inboard track assembly (38), and a front pedestal (48') and a rear pedestal (50') disposed on said floor outboard track assembly (40), said front pedestals (48,48') being taller than said rear pedestals (50,50').

* * * * *